United States Patent
Post, II et al.

(10) Patent No.: US 7,845,735 B2
(45) Date of Patent: Dec. 7, 2010

(54) METHOD FOR VEHICLE BRAKING CONTROL UTILIZING DYNAMIC FORCE PROPORTIONING BASED ON WHEEL LOADS

(75) Inventors: James W. Post, II, Dublin, OH (US); Theodore Klaus, Marysville, OH (US); Xiaodi Kang, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1004 days.

(21) Appl. No.: 10/983,393

(22) Filed: Nov. 8, 2004

(65) Prior Publication Data

US 2006/0012245 A1    Jan. 19, 2006

Related U.S. Application Data

(60) Provisional application No. 60/588,085, filed on Jul. 15, 2004.

(51) Int. Cl.
*B60T 8/17*        (2006.01)
(52) U.S. Cl. .................. 303/9.69; 303/189; 303/198
(58) Field of Classification Search ........... 303/9.62, 303/9.69, 177, 189, 198; 701/71, 72, 74, 701/75, 78, 91
See application file for complete search history.

(56) References Cited

U.S. PATENT DOCUMENTS

| | | | | |
|---|---|---|---|---|
| 4,666,013 A | * | 5/1987 | Shibahata et al. ........... 180/421 |
| 5,088,762 A | * | 2/1992 | Fukuyama et al. ......... 280/5.508 |
| 5,505,532 A | | 4/1996 | Tozu et al. |
| 5,522,482 A | * | 6/1996 | Kashiwagi et al. ........ 188/266.4 |
| 5,692,587 A | * | 12/1997 | Fratini, Jr. ................. 188/266.2 |
| 5,855,419 A | * | 1/1999 | Urai et al. ................... 303/9.69 |
| 5,941,924 A | | 8/1999 | Maisch |
| 6,766,239 B2 | | 7/2004 | Barron et al. |
| 2004/0024562 A1 | | 2/2004 | Barron et al. |
| 2004/0220715 A1 | * | 11/2004 | Kingston ..................... 701/71 |

FOREIGN PATENT DOCUMENTS

| | | | |
|---|---|---|---|
| DE | 19530735 A1 | | 2/1997 |
| DE | 10107455 A1 | | 1/2002 |
| DE | 101 58 026 | * | 6/2003 |
| GB | 2270167 A | | 3/1994 |

* cited by examiner

*Primary Examiner*—Bradley T King
(74) *Attorney, Agent, or Firm*—Mark E. Duell; Rankin Hill & Clark LLP

(57) ABSTRACT

A method and system for performing the method of controlling vehicle braking where the wheel slip of individual vehicle wheels is calculated and the load upon individual vehicle wheels is determined. A first brake line correction factor is calculated based on the determined loads upon the vehicle wheels. A second brake line correction factor is calculated based on the calculated wheel slip and the first and second load brake line correction factors are used to modulate a pressure supplied to individual wheel calipers during braking of the vehicle.

1 Claim, 2 Drawing Sheets

METHOD FOR VEHICLE BRAKING CONTROL UTILIZING DYNAMIC FORCE PROPORTIONING BASED ON WHEEL LOADS

PRIORITY CLAIM

This application claims priority to U.S. Provisional Application No. 60/588,085 filed on Jul. 15, 2004, the entirety of which is incorporated herein.

BACKGROUND OF THE INVENTION

The forward shift of wheel loads under braking application causes rear wheels to lockup prematurely, especially during emergency braking, leading to significantly reduced stopping distance as well as possible vehicle instability. From a braking performance point of view, the wheel slip ratio should be maintained around the peak or stable braking force range, as in the case of ABS operation. More generally however, during braking there is a significant amount of load shift between the wheels, resulting in considerably reduced handling and braking performance as well as vehicle instability. Ideally, the impacts of wheel load variations should be eliminated or compensated so as to maintain consistent vehicle dynamic response and performance.

In the area of braking control leading to enhanced braking performance and vehicle directional stability, braking control systems usually are feedback-based systems that respond to sensed wheel slip conditions to adjust individual wheel cylinder pressure. FIG. 1 illustrates a conventional antilock braking system (ABS) 10 including a master cylinder 12, brake caliper 14, wheel speed sensor 16, ABS controller 18, and pressure modulator or valve 20. Generally, the master cylinder 12 supplies pressurized fluid to the pressure modulator or valve 20 that, under normal conditions, passes the pressurized fluid to the calipers 14 that close upon a brake disc 22 to slow the associated wheel. The wheel speed sensor 16 supplies wheel speed signals to the ABS controller 18, which monitors the speed signals for a rapid deceleration indicative of wheel lockup. When such a rapid deceleration is sensed, the ABS controller 18 activates the pressure modulator 20 to a second position in which pressure to the calipers 14 is reduced, until a wheel acceleration is sensed by the ABS controller 18 at which point the pressure modulator 20 is moved toward the first position. The ABS controller 18 may cycle the pressure modulator 20 between the first and second positions (or positions intermediate the first and second positions) several times per second.

In antilock brake systems, loads applied to individual wheels are recognized only by their effect upon wheel slip conditions. Thus, the control of the individual line pressure is not directly linked to the corresponding wheel load variation, instead only the wheel slip variation. The controller may, as a result, have limited effectiveness in terms of quickness and accuracy in compensation and achieving smooth pressure application in the wheel cylinder.

An improved method and apparatus for vehicle braking more directly taking into account the impacts of wheel load is desired.

SUMMARY OF THE INVENTION

The known braking controller is usually designed to operate in a wheel slip-based feedback manner. However, it does not, in the current state of the art, have the capability to modulate individual line pressures directly in response to wheel load variations rather than responding to the indirect effects that wheel load variations have on wheel slip ratios.

The available wheel load information from a controlled suspension system now provides opportunities to improve various aspects of vehicle response dynamics, such as ride, handling, and braking, that are directly affected by dynamic wheel loads. Specifically, vehicle dynamics of pitch and roll may be affected as opposed to simply individual wheel dynamics such as wheel hopping. The present invention is directed toward a methodology for dynamic brake proportioning using wheel load information available from a controlled suspension.

In a preferred braking system, a controlled suspension system, that is able to determine load at individual wheels, is combined with control logic for converting determined loads into signals for modulating pressure within individual brake lines. These components are combined with components from an antilock braking system. In other words, the present invention combines feed forward control of brake line pressure with the feedback control of the ABS system.

In a preferred method of practicing the invention vehicle braking is controlled by calculating the wheel slip ratio of individual vehicle wheels, determining the load upon individual vehicle wheels, calculating a brake line correction factor based on the determined loads upon the vehicle wheels, calculating a brake line correction factor based on the calculated wheel slip, and using the calculated correction factors to modulate the pressure applied to the brake calipers during braking of the vehicle.

These and other aspects of the invention are herein described in particularized detail with reference to the accompanying figures.

DETAILED DESCRIPTION OF THE PREFERRED EMBODIMENTS

A new braking concept can now allow individual compensation of wheel load variation by using the combination of an existing braking control module with a dynamic load proportion controller capable of modulating the amount of individual line pressure based directly on the corresponding wheel load variation as described in more detail below.

This invention combines a feed-forward Dynamic Load Proportion Controller (DLPC) with a wheel slip-based feedback controller such that the brake modulator has the capability to request line pressure changes (i.e., increase or decrease braking force) in response to wheel load variations.

Figure 1:
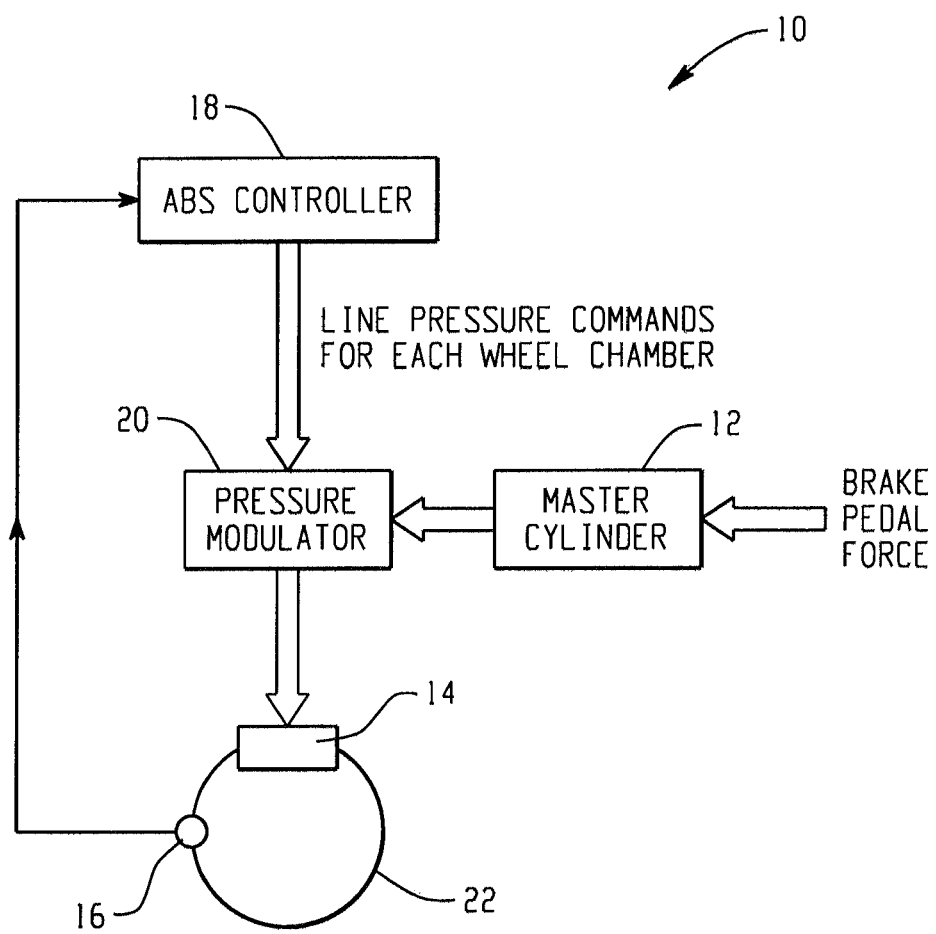
FIG. 1 is a schematic representation of a known vehicle anti-lock braking system.
Figure 2:
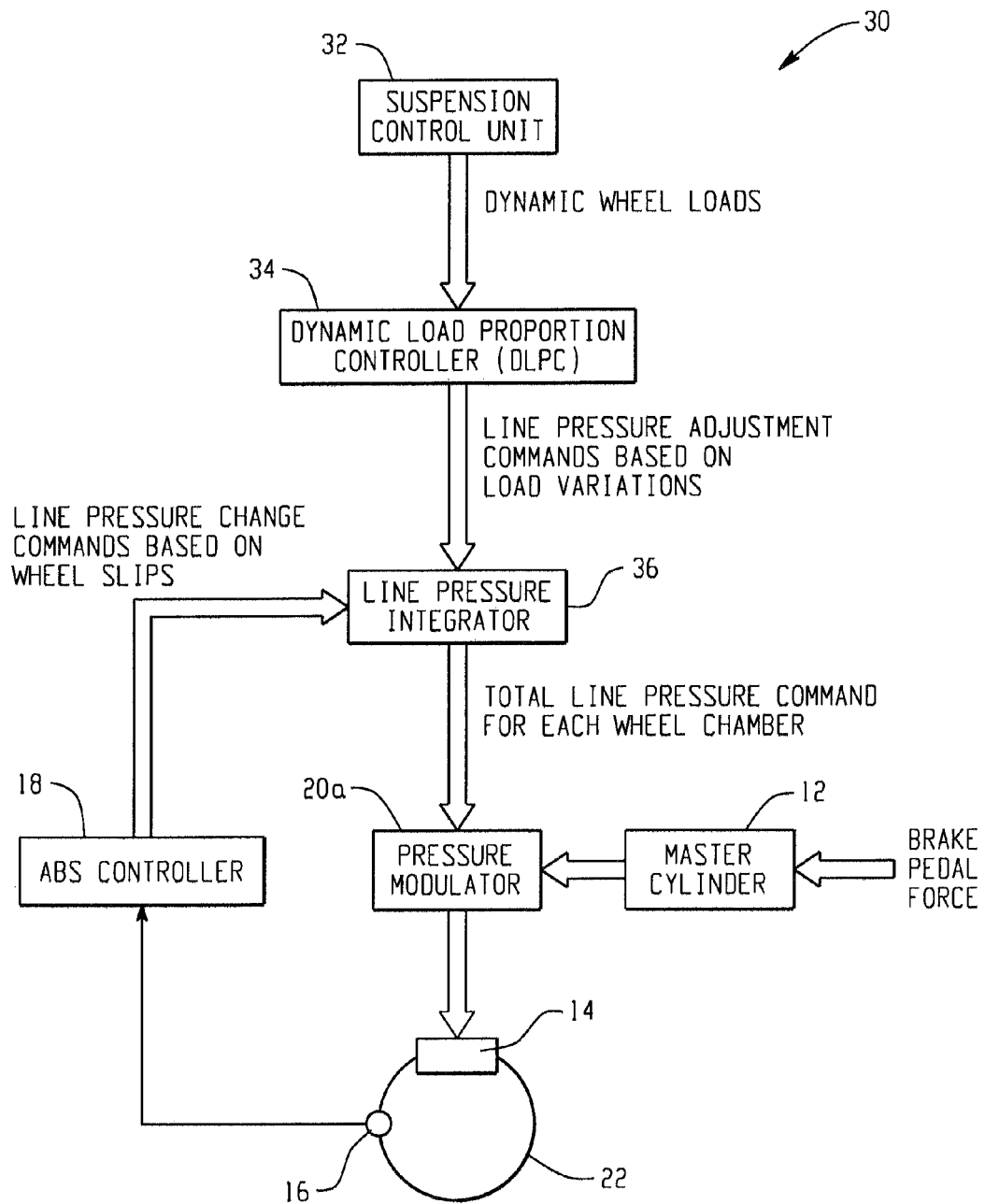
FIG. 2 is a schematic representation of a vehicle braking system adjustable using load upon individual wheels.

FIG. 2 presents the basic function of the proposed Dynamic Load Proportion Control 30 methodology in combination with wheel slip-based feed back methodology. In addition to the components described previously with respect to ABS, a controllable suspension 32, a Dynamic Load Proportion Controller (DLPC) 34, and line pressure integrator 36 are a part of the new system.

The controllable suspension 32 determines or calculates individual wheel loads from a vehicle in motion. The controllable suspension 32 preferably includes variable damping control in combination with non-controlled spring force components. Wheel load may be obtained by measurement using load sensors or via an active load or suspension component.

Various active load or suspension components are known in the art, therefore, will not be discussed in detail hereinafter. Rather, the present invention is designed to utilize measured or sensed values from such known or hereinafter developed suspension components to adjust braking control in response to, or in anticipation of, changes in individual wheels loads, as described hereinafter. Further, the control system of the present invention may make additional computations from raw data provided from the suspension components so as to provide load data in a desirable form.

The DLPC 34 receives determined wheel loads and generates a brake line correction factor directly. There is no need to calculate wheel slip variations for this correction factor. The four wheel loads calculated or determined from suspension control logic of the controlled suspension 32 are fed forward to the DLPC 34 to calculate appropriate line pressure adjustment requests based on wheel load dynamic proportion. The pressure requests are filtered through modulation dynamics to generate compensating line pressure commands and then integrated or incorporated with those requested by the conventional braking module.

Many different controller transfer functions can be used by the DLPC 34 to tune the vehicle brake performance and, more generally, other aspects of vehicle dynamic characteristics. For illustration purpose, the DLPC 30 for each wheel can be simply described by a standard second-order transfer function with a proportion gain, expressed as:

$$C_c(s) = K_p \frac{\omega_n^2}{s^2 + 2\omega_n \xi s + \omega_n^2}$$

where $K_p$ denotes the P-gain, and $\omega_n$ and $\xi$ represent the natural frequency and damping ratio of the second-order filter transfer function, respectively.

The natural frequency and damping ratio of the above second-order transfer function can be selected mainly to filter the wheel load in order to achieve quick yet smooth transient response, while the P-gain is tuned to compensate for the wheel load variation during braking in order to enhance friction utilization (i.e., to achieve peak braking force or ideal wheel slip ratios). In addition, the filter parameters and the control P-gain can be further scheduled to reflect variations in speed, surface, loading and other vehicle condition changes.

ABS controller 18 monitors wheel speed and sends control signals as described hereinbefore (individual wheel slip is calculated measured and compensated by variations in the brake line pressure). However, in the present invention signals from the ABS controller 18 are integrated with signals from the DLPC 34 by the line pressure integrator 36. The combined or integrated control signal is supplied to the pressure modulator 20*a*, and used to control or adjust the braking pressure applied via the brake caliper. In contrast to a typical ABS modulator where braking pressure supplied to a caliper may be some amount less than or equal to the pressure supplied by the master cylinder alone, the brake line adjustment factor generated from measured loads may cause the adjusted pressure supplied to individual calipers to be greater than the pressure generated by the master cylinder alone. Naturally, this may require a further component, such as a pump or pressure reservoir (not shown). Alternatively, in the present invention the available pressure may be redistributed from those lines needing less pressure to those lines needing more pressure, again possibly requiring further components (not shown).

Adjustment of braking torque based on wheel slip is a typical instance of feedback control. Changes to the torque applied to the individual wheel brakes have a direct affect on wheel slip and this affect is noticed during subsequent measurements of wheel slip. On the other hand, adjustment of braking torque based on wheel load employs feed forward control. Load variations may be measured prior to them having any affect on wheel slip and variations to brake line pressure may be made based on experimentally determined or calculated relationships in order to compensate for the expected effects. Accordingly, the braking system of the present invention is proactive, rather than reactive, and provides a smoother braking response.

The system is described using a known ABS system, but may be also used with any type of system capable of line pressure proportioning instead. In the line pressure integrator 36, brake line pressure signals generated in the DLPC 34 and ABS controller 18 are preferably combined in a linear manner, but may be proportionally combined as well.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method of controlling vehicle braking comprising:
   determining a load upon individual vehicle wheels;
   calculating a brake line correction factor based on the determined loads upon the vehicle wheels, wherein at least one filtering device is used for removing high frequency load variations from the determined loads;
   using the calculated correction factor to modulate a pressure generated by the vehicle master cylinder during braking of the vehicle;
   wherein determining the load upon individual wheels includes measuring an electrical current placed through adjustable dampers in a controlled suspension.

* * * * *